United States Patent
Hall et al.

(10) Patent No.: US 6,473,422 B2
(45) Date of Patent: *Oct. 29, 2002

(54) COMMUNICATIONS NETWORK AND METHOD FOR SCREENING INCOMING CIRCUIT SWITCHED CALLS

(75) Inventors: Göran Hall, Mölndal (SE); Henrik Hummelgren, Solna (SE); Chris Kannas, Vårgårda (SE); Richard Persson, Mölndal (SE); Hans-Olof Sundell, Öckerö (SE)

(73) Assignee: Telefonaktiebolaget LM ERicsson, Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,590

(22) Filed: Apr. 27, 1998

(65) Prior Publication Data

US 2002/0080770 A1 Jun. 27, 2002

(51) Int. Cl.[7] .......................... H04L 12/66; H04M 3/42
(52) U.S. Cl. ................... 370/352; 370/353; 379/201.01; 379/207.13
(58) Field of Search ........................ 370/352, 353, 370/354, 355, 356, 357, 310; 379/93, 96, 201.01, 207.13, 210.03, 211.02, 212.01; 455/465, 412, 515

(56) References Cited

U.S. PATENT DOCUMENTS

| | | | |
|---|---|---|---|
| 4,837,798 A | 6/1989 | Cohen et al. ................. 379/88 |
| 4,876,717 A | * 10/1989 | Barron et al. ................ 713/202 |
| 5,063,588 A | 11/1991 | Patsiokas et al. ............. 379/57 |
| 5,278,894 A | 1/1994 | Shaw .......................... 379/67 |
| 5,327,486 A | 7/1994 | Wolff et al. .................. 379/96 |
| 5,347,574 A | 9/1994 | Morganstein ................. 379/210 |
| 5,473,675 A | 12/1995 | Chapman et al. ............. 379/93 |
| 5,479,480 A | 12/1995 | Scott ........................... 379/59 |
| 5,513,251 A | 4/1996 | Rochkind et al. ............. 379/93 |
| 5,533,019 A | * 7/1996 | Jayapalan .................... 370/352 |
| 5,544,222 A | 8/1996 | Robinson et al. ............. 379/58 |
| 5,598,536 A | 1/1997 | Slaughter, III et al. . 395/200.16 |
| 5,608,786 A | 3/1997 | Gordon ....................... 379/100 |
| H001641 H | * 4/1997 | Sharman ...................... 379/60 |
| 5,666,364 A | 9/1997 | Pierce et al. ................ 370/455 |
| 5,668,862 A | 9/1997 | Bannister et al. ........... 379/201 |
| 5,701,297 A | 12/1997 | Csapo et al. ................ 370/341 |
| 5,742,668 A | * 4/1998 | Pepe et al. .................. 455/415 |
| 5,793,762 A | * 8/1998 | Penners et al. ............. 370/389 |
| 5,809,128 A | * 9/1998 | McMullin .................... 379/215 |
| 5,845,211 A | * 12/1998 | Roach, Jr. ................... 455/436 |
| 5,889,774 A | * 3/1999 | Mirashrafi et al. .......... 370/352 |
| 5,910,946 A | * 6/1999 | Csapo ......................... 370/328 |
| 5,917,817 A | * 6/1999 | Dunn et al. ................. 370/352 |
| 5,974,044 A | * 10/1999 | Ikeda et al. ................. 370/354 |
| 6,005,870 A | * 12/1999 | Leung et al. ............... 370/466 |
| 6,049,533 A | * 4/2000 | Norman et al. ............. 370/328 |
| 6,161,012 A | * 12/2000 | Fenton et al. ............... 455/432 |

FOREIGN PATENT DOCUMENTS

WO    9726764    7/1997    ............ H04Q/7/22

* cited by examiner

Primary Examiner—Hassan Kizou
Assistant Examiner—Saba Tsegaye
(74) Attorney, Agent, or Firm—Jenkens & Gilchrist PC (57) ABSTRACT

A communications network and method for screening incoming circuit switched calls directed to a mobile terminal operating in packet switched mode. The communications network includes a circuit switched network and a packet switched network. A called party uses the mobile terminal to transmit to the packet switched network a screening list containing at least one listed phone number. The packet switched network uses the screening list to inform the called party whenever an incoming circuit switched call of a calling party has a phone number matching anyone of the listed phone numbers.

35 Claims, 4 Drawing Sheets

COMMUNICATIONS NETWORK AND METHOD FOR SCREENING INCOMING CIRCUIT SWITCHED CALLS

CROSS REFERENCE TO RELATED APPLICATION

This application is related to U.S. patent application filed on Apr. 27, 1998 entitled "An Announcing System and Method used in a Communications Network for Holding Incoming Circuit Switched Calls" Ser. No. 09/067,589 which is hereby incorporated by reference herein.

BACKGROUND OF THE INVENTION

1. Technical Field of the Invention

The present invention generally relates to the telecommunications field and, in particular, to a communications network and method for screening incoming circuit switched calls directed to a mobile terminal operating in packet switched mode.

2. Description of Related Art

Some of the mobile terminals currently available to subscribers have the capability to communicate within a communications network that supports both circuit switched communications and packet switched communications. The circuit switched communications include voice and data messages that occur in a circuit switched network incorporating, for example, the Public Switched Telephone Network (PSTN) and Integrated Services Digital Network (ISDN). Whereas, the packet switched communications include data applications that occur in a packet switched network incorporating, for example, the Internet.

Developers of telecommunication systems have predicted that packet switched communications will encompass a significant part of cellular traffic in the future. Consequently, a problem may occur more frequently where a called party using the mobile terminal for packet switched communications may be interrupted by a voice page whenever an incoming circuit switched call from a calling party is received by the circuit switched network. The voice page is transmitted to the called party by an operator's communication network only when a voice paging service is active.

Unfortunately, the called party upon receiving the voice page has no informative way to decide whether or not to accept the circuit switched call, because the voice page does not identify the calling party. Therefore, the current voice paging service can be very disruptive to the called party especially when the called party discontinues an ongoing packet switched communication to answer the circuit switched call of an unannounced calling party. In fact, the called party may be disrupted every time an unwanted voice page is received from the current voice paging service.

Accordingly, there is a need for a method and communications network for screening incoming circuit switched calls directed to a mobile terminal operating in packet switched mode. There is also a need of a communications network and method for permitting the called party to update a list containing phone number(s) that are not screened if the listed phone number is the same as a phone number associated with an incoming circuit switched call. Additionally, a communications network and method are needed to inform the called party of the phone number corresponding to the calling party trying to establish the circuit switched connection. These and other needs are satisfied by the communications network and method of the present invention.

SUMMARY OF THE INVENTION

The present invention is a method and communications network for screening incoming circuit switched calls directed to a mobile terminal operating in packet switched mode. The communications network includes a circuit switched network and a packet switched network. A called party uses the mobile terminal to transmit to the packet switched network a screening list containing at least one listed phone number. The packet switched network uses the screening list to inform the called party whenever an incoming circuit switched call of a calling party has a phone number that matches one of the listed phone numbers.

In accordance with the present invention a communications network and method are provided that will enable a called party using a mobile terminal in packet switched mode to choose the particular calling parties that may interrupt their ongoing packet communications.

Further in accordance with the present invention a communications network and method are provided that enables a called party to update a list containing phone numbers used to screen incoming circuit switched calls.

Also in accordance with the present invention a communications network and method are provided to inform a called party using a mobile terminal that a particular calling party is attempting to establish a circuit switched connection.

Also in accordance with the present invention there is provided a communications network and method to lower the use of a packet channel due to the screening of incoming circuit switched calls.

Further in accordance with the present invention there is provided a communications network and method that can be implemented into a Personal Digital Cellular System.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Referring to the Drawings, wherein like numerals represent like parts throughout FIGS. 1–4, there is disclosed an exemplary communications network 100 for screening incoming circuit switched calls that can be used to implement a preferred embodiment of the present invention.

Although the communications network 100 will be discussed based on the Personal Digital Cellular System (PDC) specification, it should be understood that the PDC specification is only one of many specifications and standards that may utilize the principles of the present invention. For example, the communications network 100 may be utilized in a variety of standards including the Digital-Advanced Mobile Phone System (D-AMPS) and the Global System for Mobile Communications (GSM) System. Accordingly, the communications network 100 should not be construed in such a limited manner.

Figure 1:
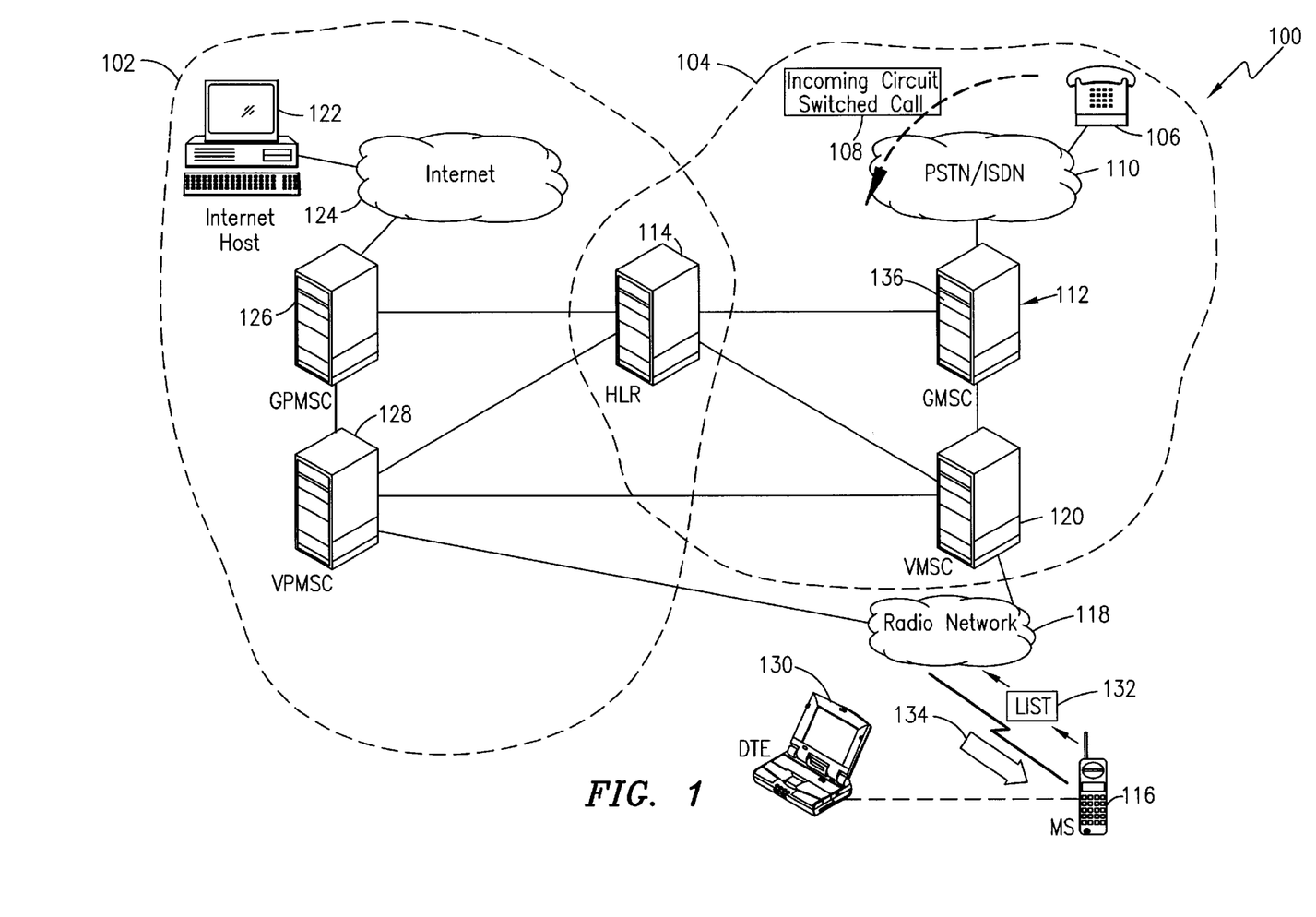
FIG. 1 is a diagram of a communications network for screening incoming circuit switched calls in accordance with the present invention.

Referring to FIG. 1, there is illustrated a diagram of the exemplary communications network 100 in accordance with the present invention. In order to better present and describe the preferred embodiment of the present invention a detailed discussion regarding the screening of incoming circuit switched calls will be deferred pending a discussion of the general architecture of the communications network 100.

The communications network 100 includes a packet switched network 102 and a circuit switched network 104. The circuit switched network 104 includes a land-based terminal 106 used by a calling party to initiate a circuit switched call 108, which is transmitted through a network 110 (e.g., PSTN/ISDN) to a gateway mobile services switching center (GMSC) 112. The land based terminal 106 has a phone number that can be associated with the circuit switched call 108. The GMSC 112 interrogates a home location register (HLR) 114 to determine if a mobile terminal 116 is in packet switched mode (e.g., data messages) or circuit switched mode (e.g., voice messages). The HLR 114 is common to both the packet switched network 102 and the circuit switched network 104. of course, the mobile terminal 116 utilizes the packet switched network 102 while operating in packet switched mode and the circuit switched network 104 while operating in circuit switched mode.

The HLR 114 in addition to knowing whether the mobile terminal 116 is operating in packet or circuit switched mode also maintains subscription data and keeps track of the location of the mobile terminal. The HLR 114 is able to keep track of the current location of the mobile terminal 116, because as the mobile terminal travels into a geographic area served by a particular radio network 118 it registers with a visited mobile services switching center (VMSC) 120 which then informs the HLR of the mobile terminal's current location. There may be multiple VMSC's 120.located in the circuit switched network 102, where all of the VMSCs would communicate with the GMSC 112. The VMSC 120 that informs the HLR 114 of the current location of the mobile terminal 116 would also operate to service the mobile terminal.

The packet switched network 102 includes an Internet host 122 (e.g., fixed terminal) capable of communicating with the mobile terminal 116 through an Internet network 124. The Internet network 124 connects to a gateway packet mobile services switching center (GPMSC) 126 that communicates with the HLR 114. The GPMSC 126 also connects to a visited packet mobile services switching center (VPMSC) 128, where the GPMSC and VPMSC are similar to the GMSC 112 and VMSC 120 of the circuit switched network 104. There may also be multiple VPMSCs 128 located within the packet switched network 104.

The mobile terminal 116 typically communicates with a data terminal equipment (DTE) 130 to allow packet data communication. Alternatively, the mobile terminal 116 may incorporate the DTE 130 instead of connecting to the DTE (as shown). In either case, the DTE 130 is assigned a permanent address or dynamic address. This address is known as an Internet Protocol (IP) address.

It should be understood that for purposes of clarity, a detailed discussion of the conventional components (e.g., HLR 114, VMSC 120, GPMSC 126) forming the communications network 100 has not been provided. However, a detailed discussion of the communications network 100 used to screen incoming circuit switched calls 108 is provided below.

Figure 4:
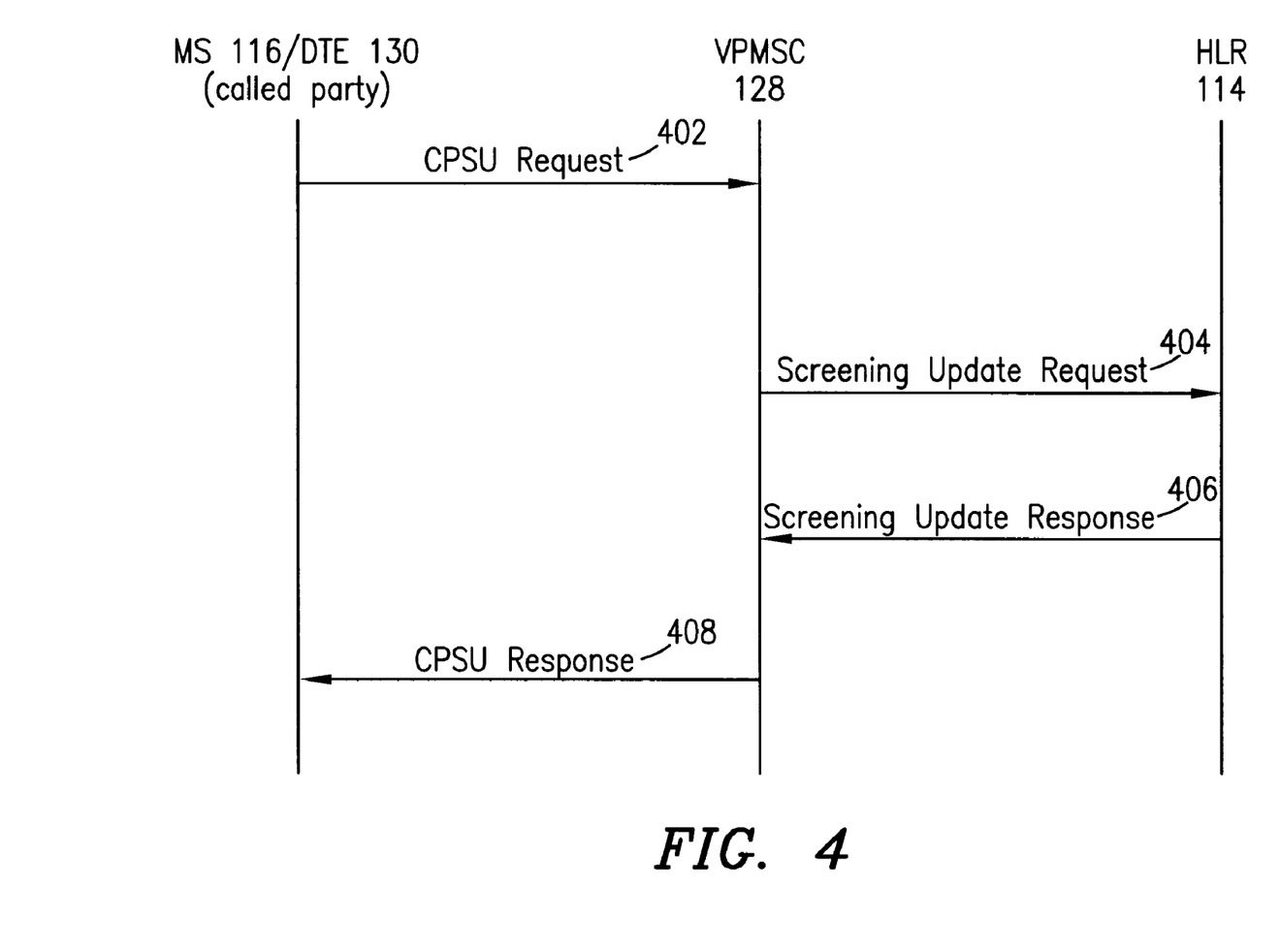
FIG. 4 is a signal sequence chart illustrating an update procedure used in the communications network.

Prior to enabling the communications network 100 to screen incoming circuit switched calls 108, the called party generates a list 132 that may be stored within the mobile terminal 116. The list 132 includes the phone numbers of the calling parties that may interrupt the called party with a voice page message 134 while the called party uses the mobile terminal 116 for packet switched communications. The voice page message 134 is generated by an operator's communications network. The list 132 generally includes more than one phone number (listed phone number) and may be dynamically updated by the called party at any time during packet switched communications or during registration (FIG. 4). For example, the list 132 can be updated by either adding or deleting the phone numbers of various calling parties.

The mobile terminal 116 transmits the list 132 to the VPMSC 128 located in the packet switched network 102, during packet communication registration. The VPMSC 128 then transmits the list 132 to the HLR 114, which stores the list 132 and the corresponding listed phone numbers as dynamic data (e.g., changeable by the called party). In effect, the HLR 114 stores only the phone numbers of the calling parties that may interrupt the called party with the voice page message 134.

The communications network 100 is triggered when the mobile terminal 116 and DTE 130 are connected to the Internet host 122 (e.g., packet switched mode) and the calling party attempts to establish a circuit switched connection with the busy mobile terminal. More specifically, the circuit switched call 108 generated by the calling party at the land based terminal 106 is transmitted to the GMSC 112, which identifies the circuit switched call by using the phone number associated with the land based terminal. The GMSC 112 in response to receiving the circuit switched call 108 then interrogates the HLR 114 to ascertain the current location of the mobile terminal 116 and to determine whether the mobile terminal is operating in packet switched mode or circuit switched mode.

If the mobile terminal 116 is operating in packet switched mode, the GMSC 112 then receives the list 132 from the HLR 114. Again, the list 132 contains the listed phone numbers of the calling parties for which the incoming circuit switched calls 108 will not be screened by the communications network 100. The GMSC 112 determines whether a match exists between the phone number of the circuit switched call 108 and anyone of the listed phone numbers.

In the event there is no match between the phone numbers or the called party rejects the circuit switched call 108, the GMSC 112 may either terminate the circuit switched call 108, reroute the circuit switched call to a voice mail service, or forward the circuit switched call to another phone number. The particular operation performed by the GMSC 112 when there is no match is dependent on the type of service ordered by the called party.

In the event there is a match between the calling party's phone number and anyone of the listed phone numbers, then the GMSC 112 forwards the circuit switched call 108 to the VMSC 120. The VMSC 120 transmits the voice page message 134 to the VPMSC 128 which then sends the voice page message on a packet channel to the mobile terminal 116. The voice page message 134 informs the called party about the circuit switched call 108, and would normally contain the phone number of the calling party. The called party can refer to the phone number transmitted by the voice page message 134 to determine whether or not to accept the circuit switched call 108.

If the called party accepts the circuit switched call 108, then the current packet switched communication is disconnected by the VPMSC 128 and the circuit switched call is connected by the VMSC 120. The called party can accept the circuit switched call 108 in several ways including, for example, by depressing a button or by saying a particular word(s).

If the called party rejects the circuit switched call 108 then the circuit switched call is handled in a similar manner where the mobile terminal 116 operating in a stand-bystate does not accept a page. In addition, a timer 136 located in the GMSC 112 can be used to reject the circuit switched call 108 if the called party does not accept or reject the circuit switched call within a predetermined amount of time. The called party or operator of the communications network 100 determines the duration of the predetermined amount of time that is measured from the time the voice page message 134 is transmitted to the mobile terminal 116.

It should be understood, that the communications network 100 is capable of supporting multiple mobile terminals 116 and screening multiple incoming circuit switched calls 108 at any given time; however, for clarity only one mobile terminal and one circuit switched call 108 are discussed. The various messages and steps used to screen the incoming circuit switched calls 108 within the communications network 100 will be discussed in detail with reference to FIGS. 2 through 4.

Figure 2:
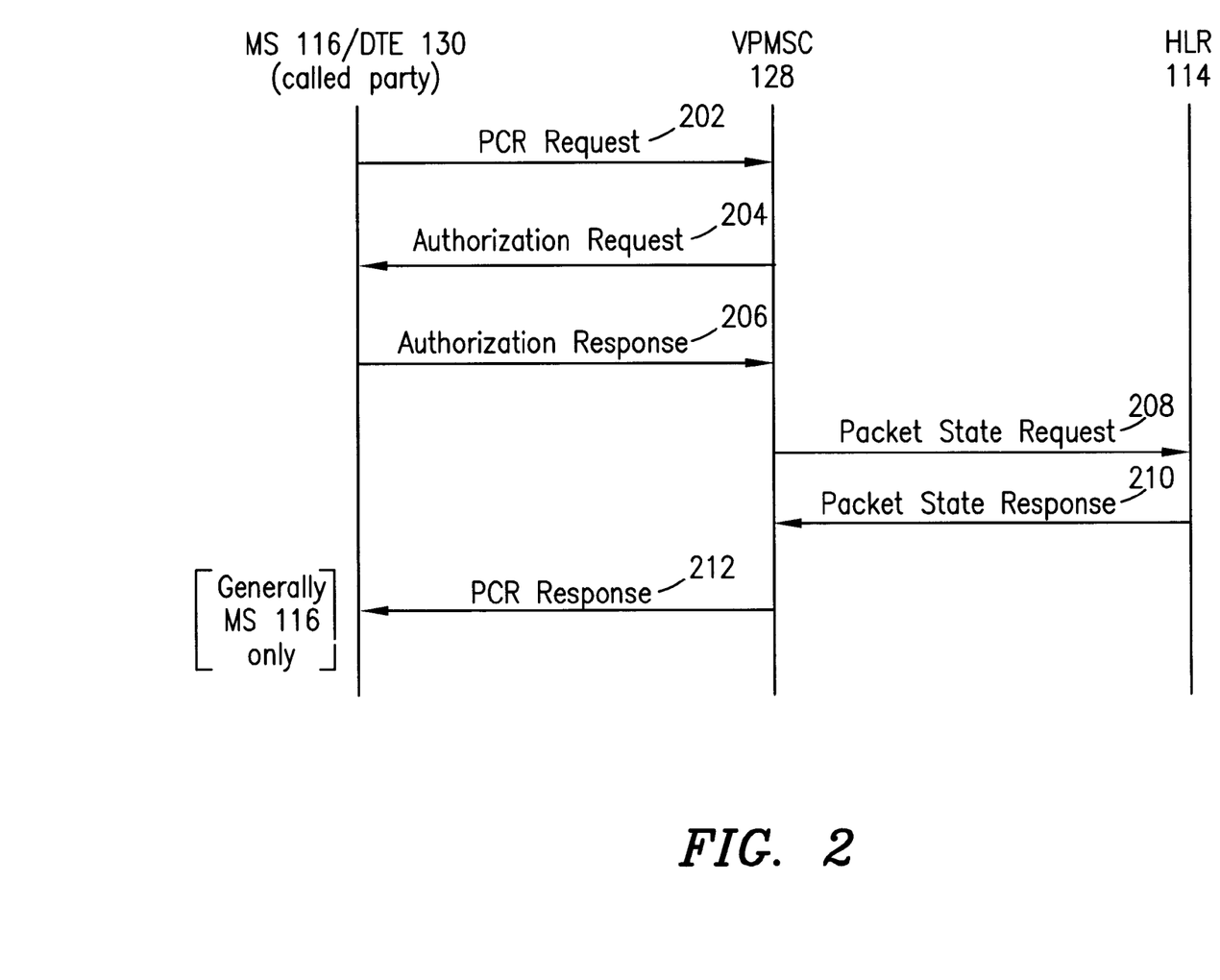
FIG. 2 is a signal sequence chart illustrating a registration procedure used in the communications network shown in FIG. 1.

Referring to FIG. 2, there is illustrated a signal sequence chart showing the events of a registration procedure that occurs prior to the screening of incoming circuit switched calls 108. Initially, the called party inputs the list 132 into the mobile terminal 116 or DTE 130, where the list contains the phone numbers of the calling parties that may page the called party in the first place. The mobile terminal 116 transmits the list 132 via a Packet Communication Registration Request (PCRRequest) signal 202 to the VPMSC 128. In response to receiving the PCRRequest signal 202, the VPMSC 128 transmits an Authorization Request signal 204 back to the mobile terminal 116 or DTE 130. The called party then inputs into the mobile terminal 116 or DTE 130 the proper code or password, which is transmitted with an Authorization Response signal 206 to the VPMSC 128.

It should be noted that the list 132 may be transmitted via a new message pair (not shown) instead of using the PCRRequest signal 202. The list 132 using the new message pair would not need to be sent at all registrations, but only when the called party would like to update the list. In addition, another message pair (not shown) may be introduced to fetch the list 132 from the HLR 114.

After the called party inputs the proper code or password and positive authentication of the called party is performed in the communications network 100, the VPMSC 128 transmits the list 132 via a Packet State Request signal 208 to the HLR 114, which stores the list 132 and the corresponding listed phone numbers as dynamic data. The HLR 114 then transmits a Packet State Response signal 210 back to the VPMSC 128, which then transmits a Packet Communication Registration Response (PCRResponse) signal 212 to the mobile terminal 116. The PCRResponse signal 212 indicates whether the list 132 was successfully received or not by the HLR 114, after a validation (e.g., format/syntax) of the list 132. At this stage, the telecommunication network 100 is ready to screen the incoming circuit switched calls 108.

Figure 3:
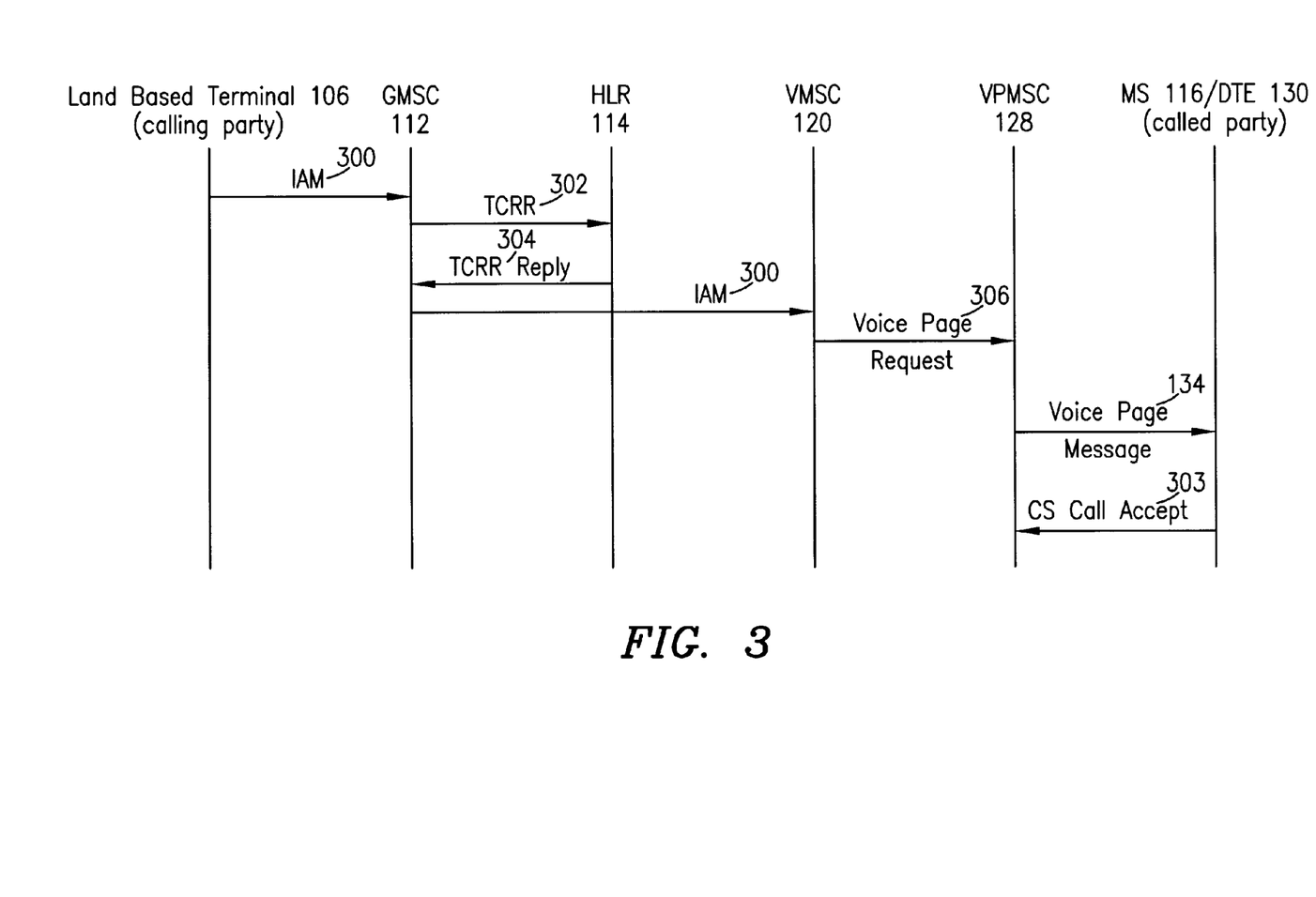
FIG. 3 is a signal sequence chart illustrating a screening operation used in the communications network.

Referring to FIG. 3, there is illustrated a signal sequence chart showing the events of the screening operation performed by the communications network 100. The called party's network 104 transmits the circuit switched call 108 as an initial address message (IAM) 300 from the land based terminal 106 towards the GMSC 112.

Upon receiving the IAM 300, the GMSC 112 forwards a TCRR signal 302 to the HLR 114. And, the HLR 114 in response to receiving the TCCR signal 302 generates and transmits a TCCR reply signal 304 back to the GMSC 112. The TCCR reply signal 304 indicates whether the mobile terminal 116 is in packet switched mode or circuit switched mode. In addition, the TCCR reply signal 304 includes the list 132 having the listed phone numbers of the calling parties for which the incoming circuit switched calls 108 may be connected with the mobile terminal 116.

The GMSC 112 determines whether a match exists between the phone number of the circuit switched call 108 and anyone of the listed phone numbers. In the event there is no match, the GMSC 112 may either terminate the circuit switched call 108, reroute the circuit switched call to a voice mail service, or forward the circuit switched call to another phone number (not shown).

On the other hand, the GMSC 112 forwards the circuit switched call 108 via the IAM 300 to the VMSC 120 when there is a match between the phone number of the calling party and anyone of the listed phone numbers. Thereafter, VMSC 120 transmits a Voice Page Request signal 306 to the VPMSC 128, which then transmits the voice page message 134 to the mobile terminal 116. The voice page message 134 may contain the phone number of the calling party associated with the incoming circuit switched call 108.

The called party may accept the circuit switched call 180 by transmitting a CS Call Accept signal 308 from the mobile terminal 116 signal 308 to the VPMSC 128. Thereafter, the current packet switched communication is disconnected by the VPMSC 128 and the circuit switched call 108 is connected by the VMSC 120. Otherwise, the called party may reject the circuit switched call 180 wherein the current packet switched communication remains connected.

Furthermore, connection of the circuit switched call 108 does not have to be triggered from VPMSC 128 at reception of the CS call accept signal 308. Instead, the mobile terminal could send a terminating condition report on a CCH channel after sending the CS call accept signal 308 and after the packet disconnection. The CCH channel is described in the PDC standard. The terminating condition report (TCRR) signal is sent on the CCH and used by the mobile station 116 as a response to a paging signal for a circuit switched call from the network.

Referring to FIG. 4, there is illustrated a signal sequence chart showing the events how the called party can dynamically update the list 132. The called party may update the list 132 by either deleting phone numbers or adding phone numbers, while the mobile terminal 116 is in packet switched mode. More specifically, the called party may update the list 132 by transmitting a Calling Party Screening Update Request (CPSURequest) signal 402 to the VPMSC 128. The CPSURequest signal 402 contains the phone number(s) that are to be added or deleted from the list 132.

In response to the CPSURequest signal 402, the VPMSC 128 transmits the updated phone numbers to the HLR 114 via a Screening Update Request signal 404. The HLR 114 then transmits a Screening Update Response signal 406 back to the VPMSC 128. The VPMSC 128 then transmits a Calling Party Screening Update Response (CPSUResponse) signal 408 to the mobile terminal 116 or DTE 130. The Screening Update Response signal 406 and CPSUResponse signal 408 each indicate whether or not the list 132 has been successfully updated, after the validation of the list 132. It should be noted that the communications network 100 may be applied in the Personal Digital Cellular System without affecting the specification, except for the CPSURequest signal 402 and the CPSUResponse signal 408.

Thereafter, the new incoming circuit switched calls 108 are compared to the updated list 132 in the same manner as described earlier.

From the foregoing, it can be readily appreciated by those skilled in the art that the present invention provides a method and communications network for screening incoming circuit switched calls directed to a mobile terminal operating in packet switched mode. Also, the communications network and method as disclosed enables a called party to update the phone numbers located on a list that is used in the screening of incoming circuit switched calls.

Although one embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions as may be included in the spirit and scope of the invention as defined in the following claims.

What is claimed is:

1. A communications network for screening incoming circuit switched calls, said communications network comprising:
    a packet switched network;
    a circuit switched network coupled to the packet switched network;
    a mobile terminal of a called party registered for packet switched communications capable of communicating through either the circuit switched network or the packet switched network, said mobile terminal having the ability to screen calls while said called party is communicating through said packet switched network by generating and transmitting to a visited packet mobile services switching center within said packet switched network a list having at least one listed phone number, each listed phone number corresponding to a calling party;
    said circuit switched network further including a gateway mobile services switching center for determining whether a match exists between a phone number of an incoming circuit switched call and anyone of the at least one listed phone number; and
    said visited packet mobile services switching center within said packet switched network for informing the called party currently operating in said packet switched network of the incoming circuit switched call when said gateway mobile services switching center has determined a match to exists.

2. The communications network of claim 1, wherein said mobile terminal includes means for updating the list.

3. The communications network of claim 2, wherein the means for updating includes transmitting a Calling Party Screening Update Signal to the packet switched network.

4. The communications network of claim 1, wherein said packet switched network and said circuit switched network include a home location register for storing the list as dynamic data.

5. The communications network of claim 1, wherein said packet switched network further includes a visited packet mobile services switching center for receiving the list from the mobile terminal.

6. The communications network of claim 1, wherein the circuit switched network includes a gateway mobile services switching center for determining whether a match exists between the phone number of the circuit switched call from said calling party and said anyone of the at least one listed phone number.

7. The communications network of claim 1, wherein said packet switched network includes a visited packet mobile services switching center for transmitting the phone number of the circuit switched call to the mobile terminal when the phone number of the circuit switch call matches said anyone of the at least one listed phone number.

8. The communications network of claim 7, wherein said mobile terminal includes means for transmitting an acceptance signal to the packet switched network in response to receiving the transmitted phone number.

9. The communications network of claim 8, wherein the packet switched network includes a visited packet mobile services switching center for disconnecting the packet switched communications between the mobile terminal and the packet switched network in response to receiving the acceptance signal.

10. The communications network of claim 9, wherein the circuit switched network includes a visited mobile services switching center for connecting the circuit switched call between the mobile terminal and the circuit switched network in response to receiving the acceptance signal.

11. The communications network of claim 1, wherein said circuit switched network includes a gateway mobile services switching center for terminating the circuit switched call when the phone number of the circuit switched call does not match said anyone of the at least one listed phone number.

12. The communications network of claim 1, wherein said circuit switched network includes a gateway mobile services switching center for rerouting the circuit switched call to a voice mail service when the phone number of the circuit switched call does not match said anyone of the at least one listed phone number.

13. The communications network of claim 1, wherein said circuit switched network includes a gateway mobile services switching center for forwarding the circuit switched call to a second phone number when the phone number of the circuit switched call does not match said anyone of the at least one listed phone number.

14. The communications network of claim 1, wherein said circuit switched network further includes means for validating the list for legible numbers.

15. A communications network having a circuit switched network coupled to a packet switched network, said communications network comprising:
    a mobile terminal of a called party capable of communicating through either the circuit switched network or the packet switched network, said mobile terminal having the ability to screen calls while said mobile terminal of said called party is communicating through said packet switched network by generating a list having at least one listed phone number, each listed phone number corresponding to a calling party;
    said circuit switched network and said packet switched network including a home location register for storing the list;
    said circuit switched network further including a gateway mobile services switching center for determining whether a match exists between a phone number of an incoming circuit switched call and anyone of the at least one listed phone number; and
    said packet switched network further includes a visited packet mobile services switching center for informing the called party currently operating in said packet switched network of the circuit switched call when the gateway mobile services switching center has determined a match exists.

16. The communications network of claim 15, wherein said mobile terminal includes means for updating the list.

17. The communications network of claim 15, wherein said visited packet mobile services switching center includes means for transmitting the phone number of the circuit switched call to the mobile terminal when the phone number of the circuit switch call matches said anyone of the at least one listed phone number.

18. The communications network of claim 17, wherein said mobile terminal includes means for transmitting an acceptance signal to the visited packet mobile services switching center in response to receiving the transmitted phone number.

19. The communications network of claim 18, wherein said visited packet mobile services switching center includes means for disconnecting the packet switched communications between the mobile terminal and the packet switched network in response to receiving the acceptance signal.

20. The communications network of claim 19, wherein the circuit switched network includes a visited mobile services switching center for connecting the circuit switched call between the mobile terminal and the circuit switched network in response to receiving the acceptance signal.

21. The communications network of claim 15, wherein said gateway mobile services switching center includes means for terminating the circuit switched call when the phone number of the circuit switched call does not match said anyone of the at least one listed phone number.

22. The communications network of claim 15, wherein said gateway mobile services switching center includes means for rerouting the circuit switched call to a voice mail service when the phone number of the circuit switched call does not match said anyone of the at least one listed phone number.

23. The communications network of claim 15, wherein said gateway mobile services switching center includes means for forwarding the circuit switched call to a second phone number when the phone number of the circuit switched call does not match said anyone of the at least one list phone number.

24. The communications network of claim 15, wherein said gateway mobile services switching center includes means for rerouting the circuit switched call to a voice mail service when the called party rejects the circuit switched call.

25. The communications network of claim 15, wherein said gateway mobile services switching center includes means for forwarding the circuit switched call to another phone number when the called party rejects the circuit switched call.

26. A method used in a communications network for screening incoming circuit switched calls, said method comprising:
communicating by means of a mobile terminal capable of communicating through either a circuit switched network or a packet switched network, said mobile terminal having the ability to screen calls while said mobile terminal of a called party is communicating through said packet switched network;
generating and transmitting a list from said mobile terminal to a visited packet mobile services switching center within said packet switched network, said list having at least one listed phone number, each listed phone number corresponding to a calling party;
determining whether a match exists between a phone number of an incoming circuit switched call and anyone of the at least one listed phone number by a gateway mobile services switching center within said circuit switched network; and
informing the called party currently communicating through said packet switched network of the circuit switched call when the match has been determined to exist, said information being provided by said visited packet mobile services switching center within said packet switched network.

27. The method of claim 26, further comprising the step of updating the list during packet switched communications.

28. The method of claim 26, further comprising the step of storing the list as dynamic data.

29. The method of claim 26, further comprising the step of transmitting the phone number of the circuit switched call to the mobile terminal when the phone number of the circuit switched call matches said anyone of the at least one listed number.

30. The method of claim 29, further comprising the step of transmitting an acceptance signal from the mobile terminal to the packet switched network in response to receiving the transmitted phone number.

31. The method of claim 30, further comprising the steps of disconnecting the packet switched communication between the mobile terminal and the circuit switched network, and connecting the circuit switched call between the mobile terminal and the circuit switched network in response to receiving the acceptance signal.

32. The method of claim 26, further comprising the step of terminating the circuit switched call when the phone number of the circuit switched call does not match said anyone of the at least one listed phone number.

33. The method of claim 26, further comprising the step of rerouting the circuit switched call to a voice mail service when the phone number of the circuit switched call does not match said anyone of the at least one listed phone number.

34. The method of claim 26, further comprising the step of forwarding the circuit switched call to a second phone number when the phone number of the circuit switched call does not match said anyone of the at least one listed phone number.

35. A method used in a communications network having a circuit switched network coupled to a packet switched network, said method comprising:
communicating in said communications network by a mobile terminal of a called party capable of communicating through either the circuit switched network or the packet switched network, said mobile terminal having the ability to screen calls while said mobile terminal of said called party is communicating through said packet switched network;
generating a list having by said mobile terminal having at least one listed phone number, each listed phone number corresponds to a calling party;
transmitting said list by said mobile terminal to a visited packet mobile services switching center within the packet switched network;
determining whether a match exists between a phone number of an incoming circuit switched call and anyone of the at least one listed phone number, said determination being performed by a gateway mobile switching center within said circuit switched network; and
informing said called party currently operating in said packet switched network of the circuit switched call when said gateway mobile switching center has determined a match, said information being provided by a visited packet mobile services switching center within said packet switched network.

* * * * *

UNITED STATES PATENT AND TRADEMARK OFFICE
CERTIFICATE OF CORRECTION

PATENT NO. : 6,473,422 B2
DATED : October 29, 2002
INVENTOR(S) : Goran Hall et al.

It is certified that error appears in the above-identified patent and that said Letters Patent is hereby corrected as shown below:

Column 3,
Line 21, replace "of course," with -- Of course, --
Line 34, replace "120.located" with -- 120 located --

Column 5,
Line 7, replace "stand-bystate" with -- stand-by-state --

Column 7, line 64-Column 8, line 2,
Delete "6. The communications network of claim 1, wherein the circuit switched network includes a gateway mobile services switching center for determining whether a match exists between the phone number of the circuit switched call from said calling party and said anyone of the at least one listed phone number."

Column 10,
Lines 11-15, delete "29. The method of claim 26, further comprising the step of transmitting the phone number of the circuit switched call to the mobile terminal when the phone number of the circuit switched call matches said anyone of the at least one listed number."
Line 16, replace "The method of claim 29," with -- The method of claim 26, --

Signed and Sealed this

First Day of July, 2003

JAMES E. ROGAN
*Director of the United States Patent and Trademark Office*